United States Patent [19]

Lu et al.

[11] Patent Number: 5,513,039
[45] Date of Patent: Apr. 30, 1996

[54] ULTRAVIOLET RESISTIVE COATED MIRROR AND METHOD OF FABRICATION

[75] Inventors: Samuel Lu, Agoura; Ming-Jau Sun, Woodland Hills; Alan F. Stewart, Thousand Oaks, all of Calif.; Anthony W. Louderback, Eugene, Oreg.

[73] Assignee: Litton Systems, Inc., Woodland Hills, Calif.

[21] Appl. No.: 67,385

[22] Filed: May 26, 1993

[51] Int. Cl.$^6$ .................................................. G02B 1/10
[52] U.S. Cl. .......................... 359/584; 359/359; 359/361; 359/588; 359/589
[58] Field of Search .................. 359/359, 361, 359/584, 586, 588, 590, 589

[56] References Cited

U.S. PATENT DOCUMENTS

| | | | |
|---|---|---|---|
| Re. 32,849 | 1/1989 | Wei et al. | 204/192.27 |
| 3,528,726 | 9/1970 | Austin | 359/589 |
| 3,741,657 | 6/1973 | Andringa | 356/350 |
| 4,063,803 | 12/1977 | Wright et al. | 359/894 |
| 4,213,705 | 7/1980 | Sanders | 356/350 |
| 4,320,936 | 3/1982 | Sawamura | 359/359 |
| 4,461,532 | 7/1984 | Sato et al. | 359/359 |
| 4,504,109 | 3/1985 | Taga et al. | 359/589 |
| 4,583,822 | 4/1986 | Southwell | 359/586 |
| 4,663,557 | 5/1987 | Martin, Jr. et al. | 359/359 |
| 4,666,250 | 5/1987 | Southwell | 359/586 |
| 4,685,110 | 8/1987 | De Bell et al. | 372/103 |
| 4,793,908 | 12/1988 | Scott et al. | 204/192.26 |
| 4,809,293 | 2/1989 | De Bell et al. | 372/98 |
| 4,827,870 | 5/1989 | Lee | 118/665 |
| 4,854,670 | 8/1989 | Mellor | 359/359 |
| 4,865,405 | 9/1989 | Kageyama | 359/359 |
| 4,904,083 | 2/1990 | Lu et al. | 359/350 |
| 4,907,846 | 3/1990 | Tustison et al. | 359/359 |
| 4,925,259 | 5/1990 | Emmett | 359/359 |
| 4,934,788 | 6/1990 | Southwell | 359/586 |
| 4,966,437 | 10/1990 | Rahn | 359/586 |
| 5,073,451 | 12/1991 | Iida et al. | 359/359 |
| 5,117,150 | 5/1992 | Schwarz et al. | 359/359 |
| 5,170,291 | 12/1992 | Szczyrbowski et al. | 359/588 |
| 5,254,202 | 10/1993 | Kaplan | 359/584 |
| 5,267,081 | 11/1993 | Pein | 359/584 |
| 5,318,830 | 6/1994 | Takamatsu et al. | 359/589 |
| 5,400,179 | 3/1995 | Ito | 359/584 |
| 5,424,876 | 6/1995 | Fujii | 359/584 |

FOREIGN PATENT DOCUMENTS

| | | | |
|---|---|---|---|
| 0372438 | 6/1990 | European Pat. Off. | G02B 1/10 |
| 0379738 | 8/1990 | European Pat. Off. | G02B 1/10 |
| 2357593 | 6/1974 | Germany | 359/589 |
| 0219882 | 3/1985 | Germany | 359/584 |
| 4117256 | 12/1992 | Germany | G02B 1/10 |
| 4340905 | 11/1992 | Japan | 359/584 |
| 4-348302 | 12/1992 | Japan | 359/584 |
| 89-02607 | 3/1989 | WIPO | G02B 5/08 |

*Primary Examiner*—Paul M. Dzierzynski
*Assistant Examiner*—John Juba, Jr.
*Attorney, Agent, or Firm*—John H. Lynn

[57] ABSTRACT

A mirror for reflecting a selected frequency of light includes a plurality of alternating quarter wavelength thick layers of two dielectric materials that are resistive to physical and chemical changes upon exposure to ultraviolet radiation coated upon a substrate. The materials have different refractive indices. The materials preferably are comprised of a mixture of alumina and tantala as the high refractive index layer and alumina as the low refractive index layer.

8 Claims, 3 Drawing Sheets

ULTRAVIOLET RESISTIVE COATED MIRROR AND METHOD OF FABRICATION

BACKGROUND OF THE INVENTION

This invention relates generally to optical coatings for controlling the reflection and transmission of particular optical wavelengths at an optical surface. This invention relates particularly to optical coatings for ring laser gyroscope mirrors. Still more particularly, this invention relates to optical coatings that provide resistance to degradation of mirror surfaces under exposure to ultraviolet wavelengths in a ring laser gyroscope.

A ring laser gyroscope employs the Sagnac effect to measure rotation. Counterpropagating light beams in a closed path have transit times that differ in direct proportion to the rotation rate about an axis perpendicular to the plane of the path. In a ring laser gyroscope the closed path is defined by mirrors that direct the light beams around the path. The path is generally either square or triangular in shape, although any closed polygonal path could, in principle, be used. The closed path is typically in a cavity formed in a frame or body that is formed of a glass ceramic material.

The cavity is evacuated and then filled with a mixture of helium and neon, which is the gain medium for the laser. An electrical discharge excites the gain medium, which produces light amplification and a coherent light source. The mirrors must be precisely aligned to direct the light beams around the closed path in a manner that promotes proper operation of the laser. The mirror surface must be free of impurities to provide a laser beam intensity that will result in a usable signal.

Once laser oscillation occurs in the system at resonant frequencies, the difference in the length of the pathways traversed by the counterpropagating laser beams results in a difference or beat frequency which is sensed by a photodetector and amplified by an amplifier. The beat frequency is a result of optically heterodyning the counter propagating beams.

In almost all lasers there is a decrease in useful laser power output over the operating life of the laser. This decrease in useful power is accentuated by losses at optical elements. With lasers that lase at relatively low gain a decrease in useful power can become very significant. With lasers that operate at high gain (such as lasers which lase at some visible light frequencies) losses from optical elements, while undesirable, can often be tolerated during the operating life of the tube. However, even with such high gain lasers, eliminating or minimizing such losses is desirable. Eliminating or minimizing optical element losses can extend the useful life of the tube and provide more efficient and precise operation of the tube during its useful life.

The plasma arc generated in the tubes of gas ion lasers can produce large photon fluxes which are capable of initiating physical and chemical changes on an optical element surface exposed to the fluxes. More particularly, these photon fluxes are capable of producing photo reduction of the exposed optical element surfaces.

Exemplary materials that have been used for optical elements in such lasers includes but is not limited to crystalline $SiO_2$, Si, fused $SiO_2$, sapphire, diamond, BeO, $MgF_2$, ZnS, ZnSe, $BaF_2$, $CaF_2$, diamond-like carbon, yttrium aluminum garnet (YAG), yttrium lithium fluoride (YLF), and the like. In particular, ring laser gyroscope mirrors generally include multiple alternating layers of $SiO_2$ and $TiO_2$ arranged in a stack. These materials often experience physical and chemical changes, particularly photo reduction, on the surface exposed to the photon flux. The ZLG mirrors made with a $SiO_2/TiO_2$ multilayer stack show a UV/plasma degradation in terms of output power drop and mirror birefringence shift.

Dielectric coatings for optical applications are generally formed by vacuum evaporation, sputtering or low temperature solution deposition over a suitable glass, ceramic or metal substrate. U.S. Pat. Re. No. 32,849 issued Jan. 31, 1989 to Wei et al., U.S. Pat. No. 4,827,870, issued May 9, 1989 to Lee and U.S. Pat. No. 4,793,980, issued Dec. 27, 1988 to Scott et al. disclose apparatus and methods that may be used to form dielectric coatings on mirror substrates. The disclosures of U.S. Pat. Re. Nos. 32,849, 4,827,870 and 4,793,980 are hereby incorporated by reference into the present disclosure.

The particular optical function and the wavelength or wavelengths of use for the optical coating dictates the coating design. Here the term coatings design refers to the number of discrete layers of material to be deposited, the thickness of these layers and materials from which the layers are to be fabricated. The difference in refractive index between the materials that form the discrete layers is the physical property that, in combination with the coating design, gives the coating its unique function. For example, coatings can be designed to function as reflectors, antireflectors, polarizers and other optical elements.

It would be an advancement in the art to provide laser optical components which would not undergo photo reduction when exposed to large photon fluxes, particularly when the laser is one which generates ultraviolet radiation during operation. Such lasers produce ultraviolet radiation either incidental to or as a part of the beam and include noble gas ion lasers, excimer lasers, $CO_2$ lasers, free electron lasers, atomic metal vapor lasers, and the like.

SUMMARY OF THE INVENTION

A mirror according to the present invention for reflecting a selected frequency of light, comprises a substrate, which may be formed of Zerodur glass-ceramic material or other suitable substance having suitable thermal stability. A plurality of layers of a first dielectric material that is resistive to physical and chemical changes upon exposure to ultraviolet radiation is coated upon the substrate to a thickness equal to one quarter of the wavelength corresponding to the selected frequency in the first dielectric material. A second set of layers of a second dielectric material that is resistive to physical and chemical changes upon exposure to ultraviolet radiation is coated upon the first set of layers to a thickness equal to one quarter of the wavelength corresponding to the selected frequency in the second dielectric material. The layers of the first and second materials are applied alternately to produce a stack of layers of the first and second materials.

The first dielectric material is preferably comprised of tantala, $Ta_2O_5$ and the second dielectric is preferably comprised of alumina, $Al_2O_3$.

The first dielectric material may be comprised of titanium oxide, $TiO_2$ and the second dielectric may be comprised of alumina, $Al_2O_3$.

A mirror according to the present invention may be formed to comprise a stack of alternating layers of $TiO_2$ and the second dielectric comprises silicon dioxide, $SiO_2$ a plurality of layers of a third and fourth dielectric material added to the stack. The third dielectric material may comprise tantala and the fourth dielectric layer may comprise alumina. Alternatively, the third dielectric material may comprise a mixture of $SiO_2$ and $HfO_2$ or a mixture of $Al_2O_3$ and $HfO_2$ and the fourth dielectric layer may comprise $Al_2O_3$.

An appreciation of the objectives of the present invention and a more complete understanding of its structure and method of operation may be had by studying the following description of the preferred embodiment and by referring to the accompanying drawings.

DESCRIPTION OF THE PREFERRED EMBODIMENT

Figure 1:
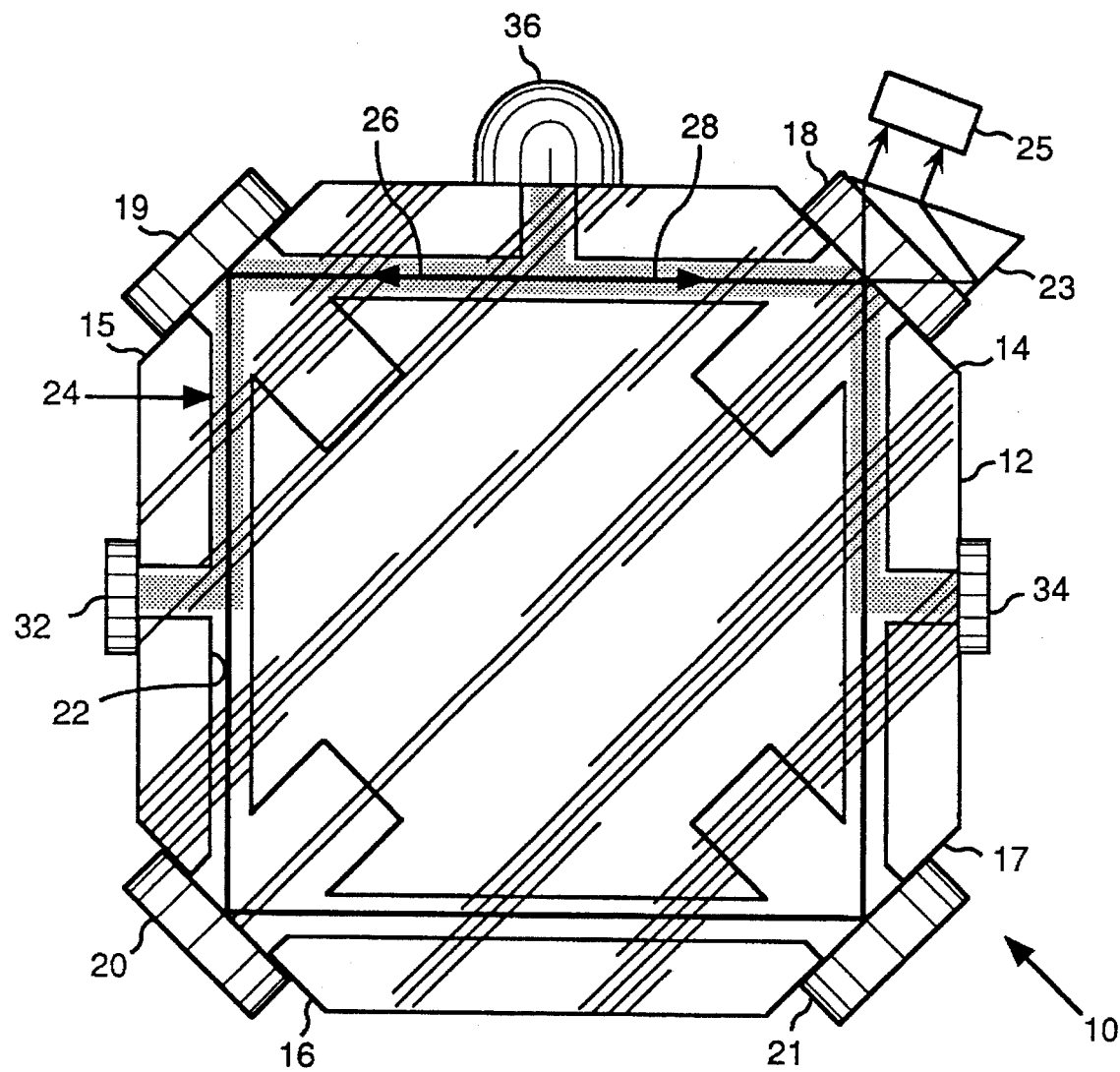
FIG. 1 is a plan view of a ring laser gyroscope showing an insulating ring connected between a ring laser gyroscope frame and a mounting device.
Figure 2:
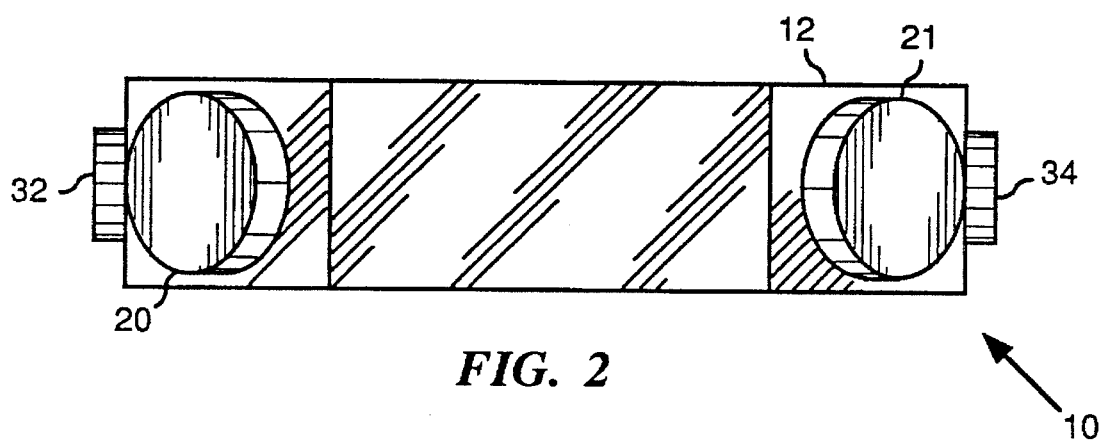
FIG. 2 is a front elevation view of the ring laser gyroscope of FIG. 1.

Referring to FIGS. 1 and 2, a basic ring laser gyroscope 10 includes a frame 12 that has a generally rectangular shape with the corners cut off to form four mounting faces 14–17. A plurality of mirrors 18–21 are mounted on the mounting faces 14–17, respectively. A cavity 22 is formed in the frame 12 to form a rectangular path around the frame 12 between the mirrors 18–21. Other structures may be used for the ring laser gyroscope 10. In particular, the ring laser gyroscope may have a triangular configuration (not shown) with three mirrors, or it may have more than four mirrors. The ring laser gyroscope may be formed to have either a planar optical path or an out of plane optical path. The basic description of the ring laser gyroscope 10 is presented by way of example to show utility of the present invention and not for limitation of the present invention to a particular ring laser gyroscope structure.

A gain medium is positioned in the cavity 22. The gain medium is typically a mixture of helium and neon, which, when electrically excited, produces counterpropagating light beams 26 and 28 in the cavity 22. A plasma discharge is confined to a region 24 of the cavity 22. Energy is delivered to the gain medium by a power supply (not shown) which applies suitable voltages to a pair of anodes 32 and 34 and to a cathode 36.

A least one of the mirrors 18 and 19 is partially transmissive to allow part of the light beams to exit the cavity for processing to determine the rotation rate and to provide signal for cavity length control. Part of the light beams incident upon the mirror 18, for example, propagate through the mirror 18 and into a combining optic 23. The combining optic 23 may be a prism that by means of internal reflections causes the beams that were perpendicular when they impinged upon the mirror surface in the cavity to emerge parallel and superimposed. The combining optic 23 thus causes the clockwise and counterclockwise beams to interfere. The structural features of suitable combining optics are well-known and are not described in greater detail herein.

A photodetector 25 produces electrical signals indicative of the light intensity in the interference pattern of the two beams. The electrical signals output from the photodetector 25 may be processed to determine the rotation rate of the device to which the ring laser gyroscope is mounted.

The mirrors 20 and 21 should have the highest possible reflectivity to minimize losses in beam intensity. The mirrors 20 and 21 generally are movable by suitable actuators (not shown) for maintaining the path length of the light beams in the cavity 22 at a value selected to provide resonance at a wavelength of light emitted by the gain medium.

Figure 3:
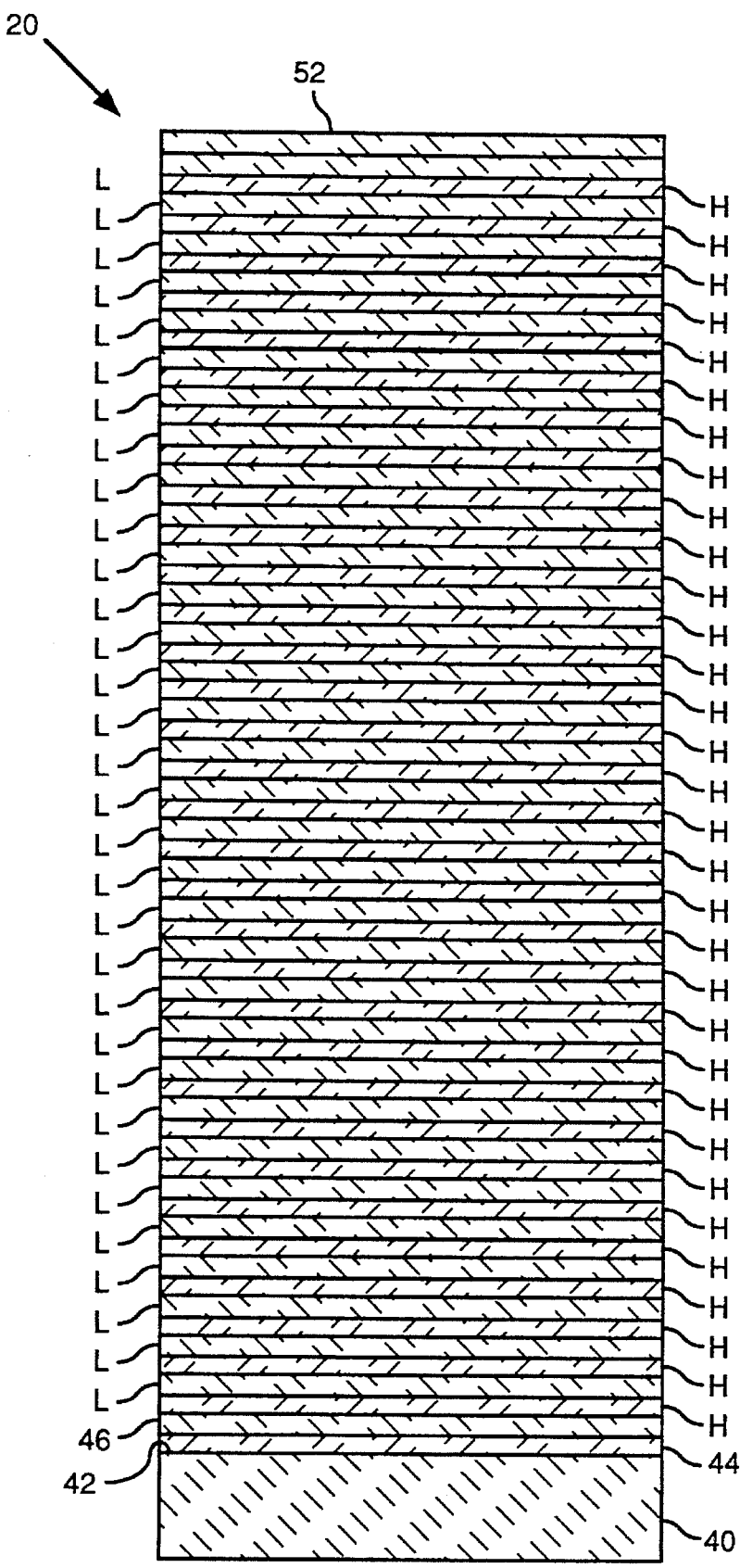
FIG. 3 is a cross-sectional view illustrates a mirror according to the present invention comprising a substrate having a plurality of layers formed thereon.

The present invention is directed to the structures of the mirrors 18–20. Referring to FIG. 3, the mirror 20, for example, includes a substrate 40 and a plurality of layers of a high refractive index material H and low refractive index material L. The substrate is preferably formed of a glass-ceramic material that is commercially available under the trademark ZERODUR. The ZERODUR glass-ceramic material is used in making ring laser gyroscope frames and mirror substrates. The properties of ZERODUR glass-ceramic material are well-known in the ring laser gyroscope arts. It has a very low coefficient of thermal expansion and therefore experiences very little change in dimension for temperature changes in the operating temperature range of ring laser gyroscopes.

The substrate 40 has an optically flat surface 42 upon which a thin layer 44 of the high refractive index material is formed. The thickness of the high refractive index layer preferably is $$\frac{\lambda}{4n_1 \cos\theta_1}$$

where $\lambda$ is the wavelength of the laser light in vacuum, $n_1$ is the refractive index, and $\theta_1$ is the angle of incidence measured between the normal to the surface of the layer 44 and the direction of the laser beam as it impinges upon the layer 44. In the present application, the wavelength is 6328 Å. The high refractive index material is preferably tantala, $Ta_2O_5$, which has a refractive index $n_1=2.05$.

A low refractive index layer 46 is formed on the high refractive index layer 44. The thickness of the low refractive index material 44 is also preferably a quarter wavelength of the laser light. The low index material is preferably formed of alumina $Al_2O_3$, which has a refractive index $n_2=1.65$. The thickness, T, of each layer is equal to $$\frac{\lambda}{4n_2 \cos\theta_2}$$

where $\lambda$ is the wavelength of the laser light in vacuum, $n_2$ is the refractive index, and $\theta_2$ is the angle of incidence measured between the normal to the surface of the layer 46 and the direction of the laser beam as it impinges upon the layer 46.

The mirror 20 preferably has thirty-three layers of the high refractive index $Ta_2O_5$ that alternate with thirty-three layers of the low refractive index $Al_2O_3$ arranged to form a stack in the usual manner for forming multilayer mirror coatings. The thirty-third layer 50 of the low index $Al_2O_3$ has an outer layer 52 of $Al_2O_3$ formed thereon. The outer layer 52 of the low index material preferably has a thickness of that is the same as that of the layer 50 and is included in the mirror 20 to minimize electric fields in the outer surface of the mirror 20.

The mirror 20 formed as described above has a reflectivity of nearly 100%. The mirror 18, which transmits part of the light incident thereon to the combining optic 23 may be formed of alternating layers of $Ta_2O_5$ and $Al_2O_3$ arranged in the manner disclosed in U.S. Pat. No. 4,904,083, which issued Feb. 27, 1990 to Lu et al. Lu et al. discloses a multilayer non-quarter wave stack sandwiched between two multilayer quarter wave stacks. One of the quarter wave stacks is formed on a substrate. The disclosure of U.S. Pat. No. 4,904,083 is hereby incorporated by reference into the present disclosure.

Tantala and alumina have significant advantages over other materials in forming ring laser gyroscope mirror coatings. Tantala and alumina have good resistance to degradation under prolonged exposure to UV radiation and do not crystallize when formed in multiple quarter wavelength coatings. Each interface between the layers is a place where scattering could occur. Crystallization causes scattering and is therefore undesirable.

An additional advantage is obtained because the refractive indices of the tantala and alumina are close together. A small surface irregularity on one layer will track though the stack to subsequent layers added to the stack where a given surface irregularity first appears. Scattered light is characterized as correlated and uncorrelated. Correlated scattering is reinforcement of scattered light from the original irregularity and from subsequent irregularities caused by the original irregularity. Correlated scattering should therefore be minimized. The amount of correlated scattering depends on the ratio $$\frac{n_1}{n_2},$$

therefore having the refractive indices of the high and low refractive, index materials be close together aids in reducing the amount of correlated scattering.

Many different coating materials have been evaluated. The absorption and birefringence of $SiO_2$ doped $HfO_2$ and $Al_2O_3$ doped coatings have been found to be very stable under exposure to UV radiation. Therefore, $HfO_2$ is a suitable coating material to be combined with $Al_2O_3$ to form an $Al_2O_3/SiO_2$-$HfO_2$ or $Al_2O_3/Al_2O_3$-$HfO_2$ UV/plasma resistive mirror stack. The refractive indices of $SiO_2$-$HfO_2$ and $Al_2O_3$ are about 1.95 and 1.65, respectively, which require about thirty-five layers of each material to build a highly reflective mirror. The amount of dopant is selected to prevent crystallization in the $HfO_2$. In a typical application approximately the $SiO_2$-$HfO_2$ layer is about 20% $SiO_2$ and about 60% $HfO_2$. When alumina doped hafnia is used as the high index layer and alumina as the low index layer the $Al_2O_3$-$HfO_2$ layer is about 5% to 7% $Al_2O_3$ and 95% to 93% $HfO_2$.

Figure 4:
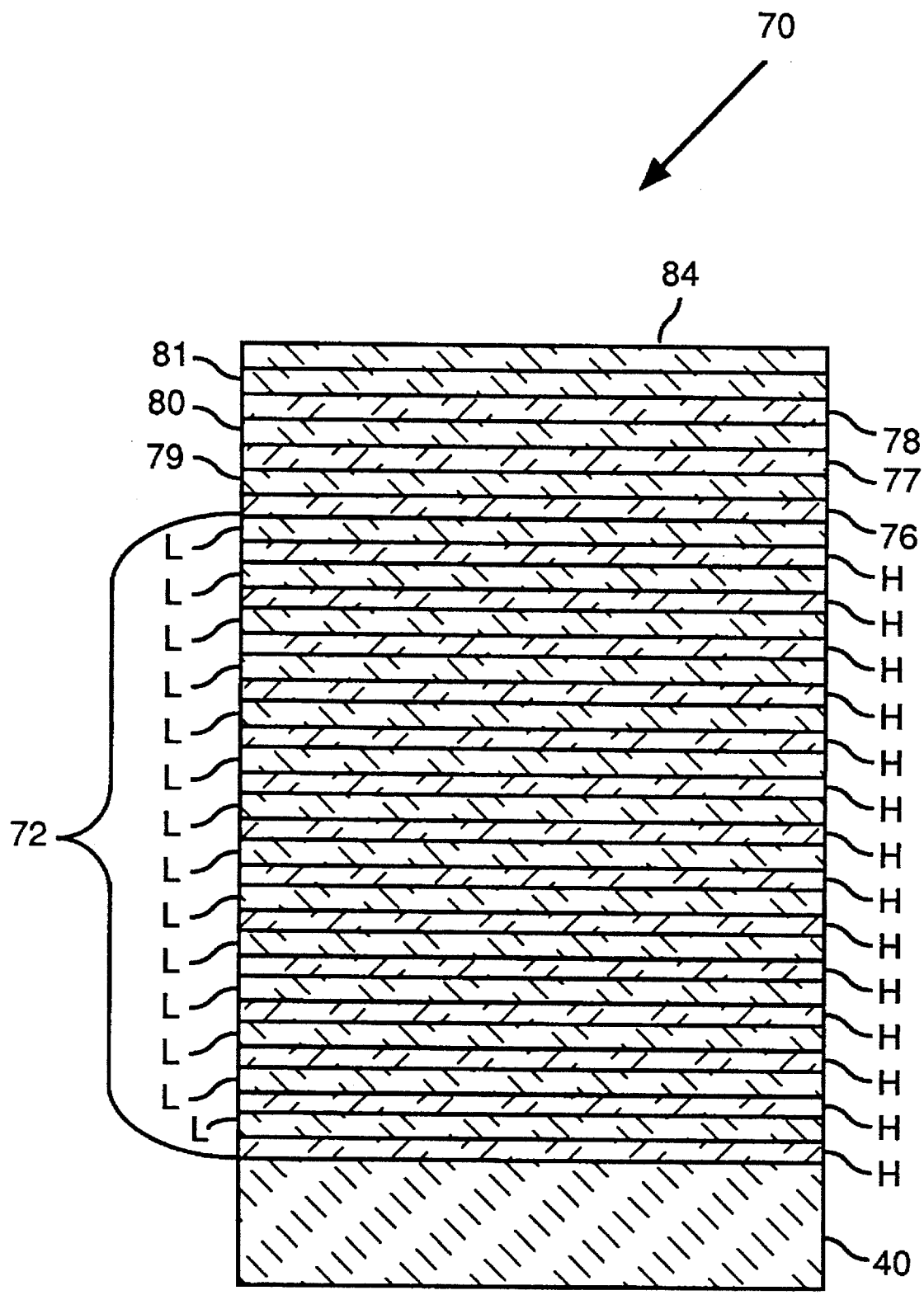
FIG. 4 is a cross-sectional view illustrating an ultraviolet-resistive coating formed on a conventional mirror.

Referring to FIG. 4, a highly reflective mirror 70 having the desired property of being durable on exposure to UV radiation may be formed by overcoating a conventional $SiO_2$/$TiO_2$ multilayer stack 72 with alternating layers of $Al_2O_3/SiO_2$-$HfO_2$ or $Al_2O_3/Al_2O_3$-$HfO_2$. This technique permits a reduction of the number of layers required to construct a UV/plasma resistive mirror. Titanium oxide $TiO_2$ has a refractive index of about 2.32. $SiO_2$ has a refractive index of about 1.46. For example, three layers of 76, 77, 78 of $Ta_2O_5$, $SiO_2$-$HfO_2$ or $Al_2O_3$-$HfO_2$ may be alternated with three layers 79, 80 81 of $Al_2O_3$ on the stack 72 to achieve high reflectivity and durability upon exposure to UV radiation. The upper layer 84 is a quarter wave thick coating of $Al_2O_3$.

The mirrors described herein are suitable for use in a Zeeman ring laser gyroscope (ZLG), a conventional two-mode ring laser gyroscope and in other applications where UV/plasma damage on mirrors may present a problem.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. A mirror for reflecting a selected frequency of light, comprising:

a substrate:

a first set of layers of a first dielectric material comprised of titanium dioxide, $TiO_2$, and having a refractive index $n_1$ coated upon the substrate to a thickness equal to one quarter of the wavelength corresponding to the selected frequency in the first dielectric material;

a second set of layers of a second dielectric material comprised of silica, $SiO_2$ and having a refractive index $n_2$ coated upon the first set of layers to a thickness equal to one quarter of the wavelength corresponding to the selected frequency in the second dielectric material, the layers of the first and second materials being applied alternately to produce a stack of layers of the first and second materials;

a layer of a third dielectric material that comprises a mixture of $SiO_2$ and $HfO_2$ coated upon one layer of the second set of layers; and a layer of a fourth dielectric material that comprises $Al_2O_3$ coated upon the layer of the third dielectric material.

2. The mirror of claim 1 wherein the third dielectric material is approximately 20% $SiO_2$ and 80% $HfO_2$.

3. A method for forming a mirror for reflecting a selected frequency of light, comprising the steps of:

forming a first set of layers of a first dielectric material from a material comprising titanium dioxide, $TiO_2$, and having refractive index $n_1$ coated on a substrate to a thickness equal to one quarter of the wavelength corresponding to the selected frequency in the first dielectric material; and forming a second set of layers of a second dielectric material comprising silica, $SiO_2$, and having refractive index $n_2$ coated upon the first set of layers to a thickness equal to one quarter of the wavelength corresponding to the selected frequency in the second dielectric material, the layers of the first and second materials being applied alternately to produce a stack of layers of the first and second materials;

forming a layer of a third dielectric material on one layer of the second set of layers from a material comprising a mixture of $SiO_2$ and $HfO_2$; and forming a layer of a fourth dielectric material on the layer of the third dielectric material from a material comprising $Al_2O_3$.

4. The method of claim 3 including the step of forming the third dielectric material to be approximately 20% $SiO_2$ and 80% $HfO_2$.

5. A mirror for reflecting a selected frequency of light, comprising:

a substrate:

a first set of layers of a first dielectric material comprised of titanium dioxide, $TiO_2$, and having a refractive index $n_1$ coated upon the substrate to a thickness equal to one quarter of the wavelength corresponding to the selected frequency in the first dielectric material;

a second set of layers of a second dielectric material comprised of silica, $SiO_2$ and having a refractive index $n_2$ coated upon the first set of layers to a thickness equal to one quarter of the wavelength corresponding to the selected frequency in the second dielectric material, the layers of the first and second materials being applied alternately to produce a stack of layers of the first and second materials;

a layer of a third dielectric material that comprises a mixture of $Al_2O_3$ and $HfO_2$; and a layer of a fourth dielectric material that comprises $Al_2O_3$.

6. The mirror of claim 5 wherein the third dielectric material is 5 to 7 percent $Al_2O_3$ and 95 to 93 percent $HfO_2$.

7. A method for forming a mirror for reflecting a selected frequency of light, comprising the steps of:

forming a first set of layers of a first dielectric material from a material comprising titanium dioxide, $TiO_2$, and having refractive index $n_1$ coated on a substrate to a thickness equal to one quarter of the wavelength corresponding to the selected frequency in the first dielectric material; and forming a second set of layers of a second dielectric material comprising silica, $SiO_2$, and having refractive index $n_2$ coated upon the first set of layers to a thickness equal to one quarter of the wavelength corresponding to the selected frequency in the second dielectric material, the layers of the first and second materials being applied alternately to produce a stack of layers of the first and second materials;

forming a layer of a third dielectric material on one layer of the second set of layers from a material comprising a mixture of $Al_2O_3$ and $HfO_2$; and forming a layer of a fourth dielectric material on the layer of the third dielectric material from a material comprising $Al_2O_3$.

8. The method of claim 7 including the step of forming the third dielectric material to be between 5 to 7 percent $Al_2O_3$ and between 95 to 93 percent $HfO_2$.

* * * * *